US007631710B2

(12) United States Patent
Utsumi

(10) Patent No.: US 7,631,710 B2
(45) Date of Patent: Dec. 15, 2009

(54) HYBRID VEHICLE AND CONTROL METHOD OF THE SAME

(75) Inventor: Atsuko Utsumi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 68 days.

(21) Appl. No.: 12/155,203

(22) Filed: May 30, 2008

(65) Prior Publication Data

US 2008/0296908 A1 Dec. 4, 2008

(30) Foreign Application Priority Data

May 31, 2007 (JP) ............................ 2007-144645

(51) Int. Cl.
*B60K 6/20* (2007.10)

(52) U.S. Cl. ............................ 180/65.21; 180/65.265; 180/65.275; 180/65.28; 180/65.285; 701/101; 701/102; 701/112; 701/113; 701/114; 123/179.3; 123/179.4; 477/3; 340/3.1

(58) Field of Classification Search .............. 180/65.21, 180/65.265, 65.275, 65.28, 65.285; 701/101–105, 701/109, 112–115; 123/179.3–179.4; 477/3; 340/3.1

See application file for complete search history.

(56) References Cited

U.S. PATENT DOCUMENTS

| | | | | |
|---|---|---|---|---|
| 3,948,228 | A * | 4/1976 | Luchaco | 123/688 |
| 5,371,412 | A | 12/1994 | Iwashita et al. | |
| 6,543,431 | B2 * | 4/2003 | Surnilla et al. | 123/685 |
| 6,571,157 | B1 * | 5/2003 | Dahlin et al. | 701/22 |
| 6,961,653 | B2 * | 11/2005 | Maki | 701/109 |
| 7,021,300 | B2 * | 4/2006 | Maki et al. | 123/688 |
| 7,478,692 | B2 * | 1/2009 | Taue et al. | 180/65.29 |
| 2007/0149349 | A1 * | 6/2007 | Utsumi et al. | 477/3 |
| 2008/0071441 | A1 * | 3/2008 | Nishigaki | 701/29 |
| 2008/0296908 | A1 * | 12/2008 | Utsumi | 290/40 C |
| 2009/0058326 | A1 * | 3/2009 | Oyobe et al. | 318/53 |
| 2009/0118080 | A1 * | 5/2009 | Heap et al. | 477/3 |
| 2009/0118977 | A1 * | 5/2009 | Whitney et al. | 701/103 |
| 2009/0151469 | A1 * | 6/2009 | Suzuki | 73/847 |
| 2009/0183706 | A1 * | 7/2009 | Miwa et al. | 123/179.3 |

FOREIGN PATENT DOCUMENTS

| | | |
|---|---|---|
| JP | 06-165309 A | 6/1994 |
| JP | 06-233410 | 8/1994 |
| JP | 2914059 | 4/1999 |
| JP | 2006-194215 | 7/2006 |
| JP | 2007-176421 | 7/2007 |

* cited by examiner

*Primary Examiner*—Paul N Dickson
*Assistant Examiner*—Jacob Meyer
(74) *Attorney, Agent, or Firm*—Kenyon & Kenyon LLP

(57) ABSTRACT

In the case where predetermined abnormality detection performed with operation of an engine, such as abnormality detection of a fuel system and an ignition system of the engine and various sensors, has not been completed (in the case where an abnormality detection completion flag F is zero), self-sustaining operation of the engine is performed to continue the operation (S280) when the engine is being operated and a power demand Pe* of the engine is less than a threshold Pstop1 for stopping the operation of the engine in normal time (S130) but is a threshold Pstop2 or more smaller than the threshold Pstop1 (S200 and S210), and the engine is started when the engine is not being operated and the power demand Pe* is a threshold Pstart2 or more smaller than a threshold Pstart1 for starting the engine in normal time (S310 and S320). This ensures performance of the predetermined abnormality detection.

6 Claims, 7 Drawing Sheets

HYBRID VEHICLE AND CONTROL METHOD OF THE SAME

BACKGROUND

1. Technical Field

The present invention relates to a hybrid vehicle including an internal combustion engine, an electric motor, and an accumulator unit that can supply and receive electric power to and from the electric motor and can be charged with electric power from an external power supply, the hybrid vehicle selecting an electric motor operation mode in which the vehicle can run with power from the electric motor with operation of the internal combustion engine being stopped, or an engine operation mode in which the vehicle can run with the operation of the internal combustion engine, and a control method thereof.

2. Related Art

A conventionally proposed hybrid vehicle of this type includes an engine, a generator that generates electric power with power from the engine, a drive motor, and a battery that supplies and receives electric power to and from the generator and the motor (for example, see Japanese Patent Laid-open No. 6-165309). In this hybrid vehicle, the engine is started when a charge amount of the battery becomes lower than a lower limit value and the engine is stopped when the charge amount of the battery exceeds an upper limit value, and thus the charge amount of the battery is maintained within a certain range, and the engine is started when an elapsed time since the stop of the engine exceeds a predetermined time.

SUMMARY OF THE INVENTION

In an automobile including an engine, predetermined abnormality detection (for example, abnormality detection of various sensors mounted to the engine such as an air/fuel ratio sensor or abnormality detection of a fuel system such as a fuel injection valve) is performed for ensuring proper operation of the engine, and such abnormality detection is performed during the operation of the engine. The above described hybrid vehicle can run only with power from the motor with the operation of the engine being stopped. Thus, in some cases, abnormality detection of the engine cannot be performed with appropriate frequency. Particularly, a hybrid vehicle of a type that can previously charge a battery with electric power from an external power supply can run for long hours only with power from a motor with an engine being stopped, and thus the above described problem is highlighted.

A hybrid vehicle and a control method thereof according to the present invention have an object to perform predetermined abnormality detection performed with operation of an internal combustion engine with more appropriate frequency.

To achieve the above described object, the hybrid vehicle and the control method thereof according to the present invention adopt the following configuration.

The present invention is directed to a hybrid vehicle which includes: an internal combustion engine; an electric motor; and an accumulator unit that can supply and receive electric power to and from the electric motor and can be charged with electric power from an external power supply. The hybrid vehicle selects an electric motor operation mode in which the vehicle can run with power from the electric motor with operation of the internal combustion engine being stopped, or an engine operation mode in which the vehicle can run with the operation of the internal combustion engine. The hybrid vehicle further includes: an abnormality detection module that performs predetermined abnormality detection with operation of the internal combustion engine; a required driving force setting module that sets a required driving force required for running; and a control unit that controls the internal combustion engine and the electric motor so that when the predetermined abnormality detection has been performed, the electric motor operation mode or the engine operation mode is selected under a predetermined condition, and the vehicle runs with a driving force based on the set required driving force in the selected mode, and controls the internal combustion engine and the electric motor so that when the predetermined abnormality detection has not been performed, the electric motor operation mode or the engine operation mode is selected under a condition different from the predetermined condition so that the engine operation mode is easily selected, and the vehicle runs with a driving force based on the set required driving force in the selected mode.

In the hybrid vehicle of the present invention, the predetermined abnormality detection is performed with the operation of the internal combustion engine, the required driving force required for running is set, and the internal combustion engine and the electric motor are controlled so that when the predetermined abnormality detection has been performed, the electric motor operation mode or the engine operation mode is selected under the predetermined condition, and the vehicle runs with the driving force based on the required driving force in the selected mode, and the internal combustion engine and the electric motor are controlled so that when the predetermined abnormality detection has not been performed, the electric motor operation mode or the engine operation mode is selected under the condition different from the predetermined condition so that the engine operation mode is easily selected, and the vehicle runs with the driving force based on the required driving force in the selected mode. In this manner, when the predetermined abnormality detection performed with the operation of the internal combustion engine has not been performed, the electric motor operation mode or the engine operation mode is selected under the condition different from the predetermined condition so that the engine operation mode is easily selected, and thus the predetermined abnormality detection can be performed with more appropriate frequency. When a plurality of items are to be subjected to the abnormality detection, the wording "the predetermined abnormality detection has been performed" includes a case where abnormality detection of all of the items has been performed, and a case where abnormality detection of part of the items has been performed.

In the hybrid vehicle of the present invention, the control unit may control the internal combustion engine and the electric motor so that when the predetermined abnormality detection has not been performed, and when the electric motor operation mode is selected under the predetermined condition while the engine operation mode is selected under the condition different from the predetermined condition, the internal combustion engine performs self-sustaining operation and the vehicle runs with the set required driving force. Thus, the predetermined abnormality detection can be performed more stably.

In the hybrid vehicle of the present invention, the control unit may select the engine operation mode and perform control when the predetermined abnormality detection has been performed and power to be outputted from the internal combustion engine based on the set required driving force is a first threshold or more as the predetermined condition. The control unit may select the engine operation mode and perform control when the predetermined abnormality detection has not been performed and power to be outputted from the internal combustion engine based on the set required driving force is a second threshold or more smaller than the first threshold as the condition different from the predetermined condition.

The hybrid vehicle of the present invention may further include an electric power and mechanical power input output module that is connected to a drive shaft joined to an axle and connected to an output shaft of the internal combustion engine rotatably independently from the drive shaft, and can output at least part of power from the internal combustion engine to the drive shaft by input and output of electric power and mechanical power. In the hybrid vehicle, the control unit may control the internal combustion engine, the electric power and mechanical power input output module, and the electric motor so that the vehicle runs with the driving force based on the set required driving force.

In this case, the electric power and mechanical power input output module may include a generator that can input and output power, and a three shaft-type power input output module that is connected to three shafts including the output shaft of the internal combustion engine, a rotating shaft of the generator, and the drive shaft, and inputs and outputs power to remaining one shaft based on power inputted and outputted to any two shafts among the three shafts.

The present invention in directed to a control method of a hybrid vehicle which includes an internal combustion engine, an electric motor, and an accumulator unit that can supply and receive electric power to and from the electric motor and can be charged with electric power from an external power supply. The hybrid vehicle selects an electric motor operation mode in which the vehicle can run with power from the electric motor with operation of the internal combustion engine being stopped, or an engine operation mode in which the vehicle can run with the operation of the internal combustion engine. The control method includes the steps of:

(a) performing predetermined abnormality detection with the operation of the internal combustion engine;

(b) setting a required driving force required for running;

(c) controlling the internal combustion engine and the electric motor so that when the predetermined abnormality detection has been performed, the electric motor operation mode or the engine operation mode is selected under a predetermined condition, and the vehicle runs with a driving force based on the set required driving force in the selected mode, and controlling the internal combustion engine and the electric motor so that when the predetermined abnormality detection has not been performed, the electric motor operation mode or the engine operation mode is selected under a condition different from the predetermined condition so that the engine operation mode is easily selected, and the vehicle runs with a driving force based on the set required driving force in the selected mode.

According to the control method of a hybrid vehicle of the present invention, the predetermined abnormality detection is performed with the operation of the internal combustion engine, the required driving force required for running is set, and the internal combustion engine and the electric motor are controlled so that when the predetermined abnormality detection has been performed, the electric motor operation mode or the engine operation mode is selected under the predetermined condition, and the vehicle runs with the driving force based on the required driving force in the selected mode, and the internal combustion engine and the electric motor are controlled so that when the predetermined abnormality detection has not been performed, the electric motor operation mode or the engine operation mode is selected under the condition different from the predetermined condition so that the engine operation mode is easily selected, and the vehicle runs with the driving force based on the required driving force in the selected mode. In this manner, when the predetermined abnormality detection performed with the operation of the internal combustion engine has not been performed, the electric motor operation mode or the engine operation mode is selected under the condition different from the predetermined condition so that the engine operation mode is easily selected, and thus the predetermined abnormality detection can be performed with more appropriate frequency. When a plurality of items are to be subjected to the abnormality detection, the wording "the predetermined abnormality detection has been performed" includes a case where abnormality detection of all of the items has been performed, and a case where abnormality detection of part of the items has been performed.

In the control method of a hybrid vehicle of the present invention, Step (c) may include controlling the internal combustion engine and the electric motor so that when the predetermined abnormality detection has not been performed, and when the electric motor operation mode is selected under the predetermined condition while the engine operation mode is selected under the condition different from the predetermined condition, the internal combustion engine performs self-sustaining operation and the vehicle runs with the set required driving force. Thus, the predetermined abnormality detection can be performed more stably.

In the control method of a hybrid vehicle of the present invention, Step (c) may include selecting the engine operation mode and performing control when the predetermined abnormality detection has been performed and power to be outputted from the internal combustion engine based on the set required driving force as the predetermined condition is a first threshold or more, and selecting the engine operation mode and performing control when the predetermined abnormality detection has not been performed and power to be outputted from the internal combustion engine based on the set required driving force as the condition different from the predetermined condition is a second threshold or more smaller than the first threshold.

DESCRIPTION OF THE PREFERRED EMBODIMENTS

Figure 1:
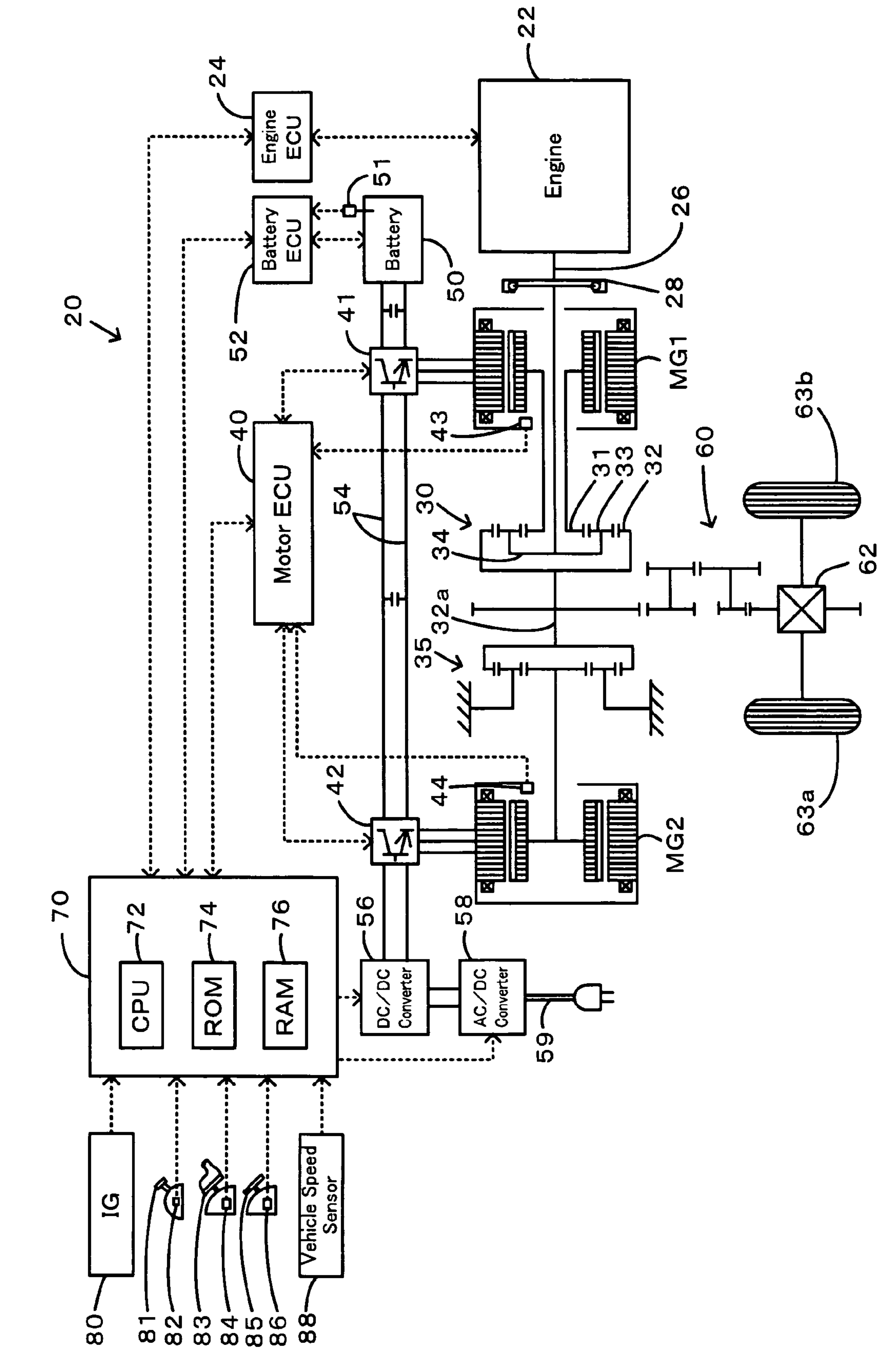
FIG. 1 is a schematic block diagram of a configuration of a hybrid vehicle 20 according to an embodiment of the present invention.
Figure 2:
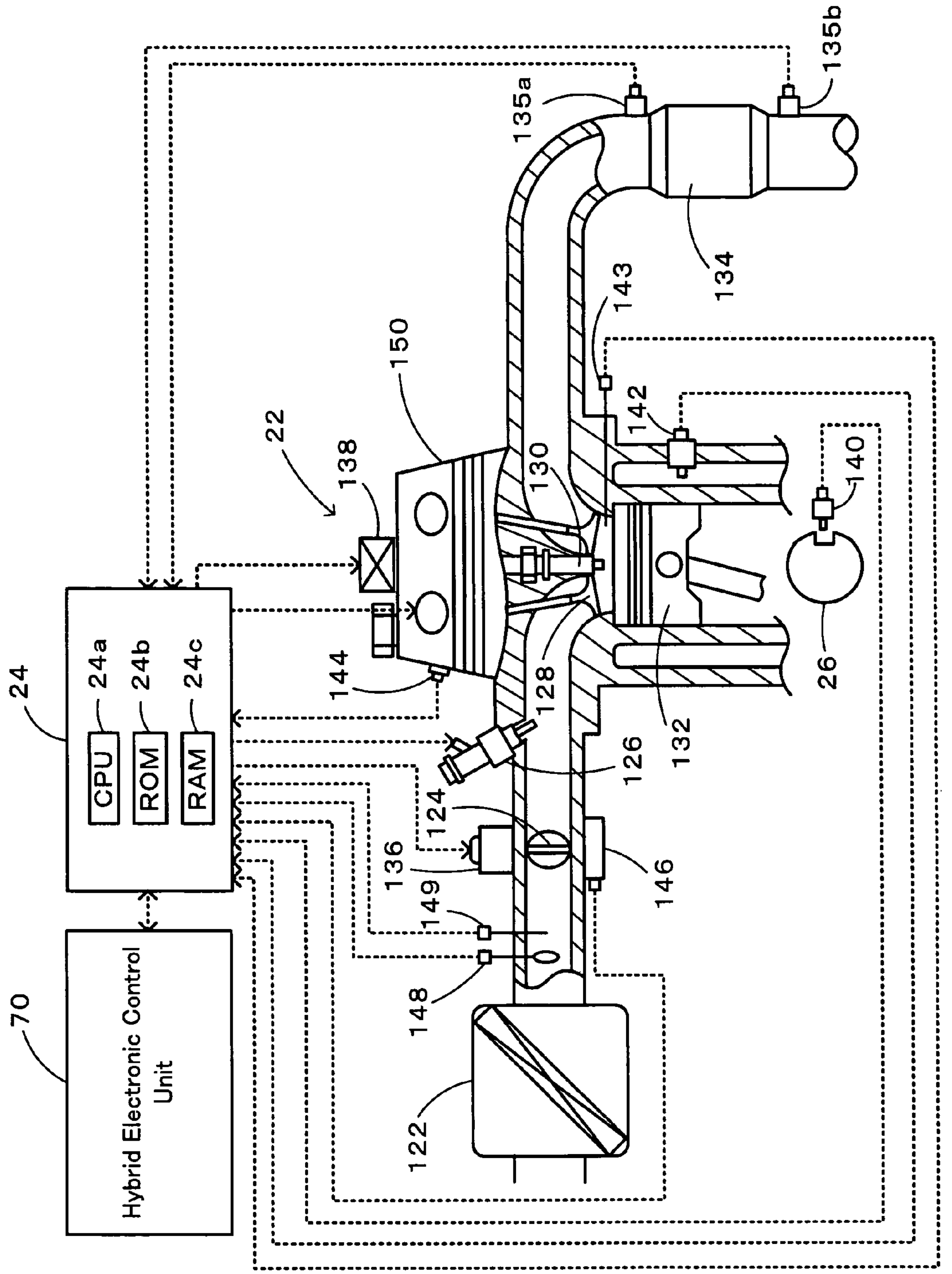
FIG. 2 is a schematic block diagram of a configuration of an engine 22.

FIG. 1 is a schematic block diagram of a configuration of a hybrid vehicle 20 according to an embodiment of the present invention, and FIG. 2 is a schematic block diagram of a configuration of an engine 22. The hybrid vehicle 20 according to the embodiment includes, as shown, an engine 22, a three shaft-type power distribution and integration mechanism 30 connected to a crankshaft 26 as an output shaft of the engine 22 via a damper 28, a motor MG1 that is connected to the power distribution and integration mechanism 30 and can generate electric power, a reduction gear 35 mounted to a ring gear shaft 32*a* as a drive shaft connected to the power distribution and integration mechanism 30, a motor MG2 connected to the reduction gear 35, and a hybrid electronic control unit 70 that controls the entire drive system.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a purifier 134 (three-way catalyst) to convert toxic components included in the exhaust, that is, carbon monoxide (CO), hydrocarbons (HC), and nitrogen oxides (NOx), into harmless components, and is discharged to the outside air.

The engine 22 is controlled by an engine electronic control unit (hereinafter referred to as an engine ECU) 24. The engine ECU 24 is configured as a microprocessor mainly including a CPU 24*a*, a ROM 24*b* that stores a processing program, a RAM 24*c* that temporarily stores data, and unshown input and output ports and communication ports. To the engine ECU 24, signals from various sensors that detect the state of the engine 22, for example, a crank position from a crank position sensor 140 that detects a rotational position of the crankshaft 26, cooling water temperature from a water temperature sensor 142 that detects temperature of cooling water of the engine 22, pressure in a cylinder Pin from a pressure sensor 143 mounted in a combustion chamber, a cam position from a cam position sensor 144 that detects a rotational position of a cam shaft that opens and closes an intake valve 128 and an exhaust valve that intake and exhaust air to and from a combustion chamber, a throttle position from a throttle valve position sensor 146 that detects a position of a throttle valve 124, an airflow meter signal AF from an airflow meter 148 mounted to an intake pipe, intake air temperature from a temperature sensor 149 also mounted to the intake pipe, an air/fuel ratio AF from an air/fuel ratio sensor 135*a*, and an oxygen signal from an oxygen sensor 135*b* are input via the input port. From the engine ECU 24, various control signals for driving the engine 22, for example, a drive signal to a fuel injection valve 126, a drive signal to a throttle motor 136 that adjusts the position of the throttle valve 124, a control signal to an ignition coil 138 integrated with an igniter, and a control signal to a variable valve timing mechanism 150 that can change opening and closing timing of the intake valve 128 are output via the output port. The engine ECU 24 communicates with the hybrid electronic control unit 70, and controls operation of the engine 22 by a control signal from the hybrid electronic control unit 70 and outputs data on an operation state of the engine 22 as required. The engine ECU 24 also performs arithmetic operations to compute a rotation speed of the crankshaft 26, that is, a rotation speed Ne of the engine 22 based on the crank position from the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32*a*. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63*a* and 63*b* via the gear mechanism 60, and the differential gear 62 from ring gear shaft 32*a*.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is controlled by a battery electronic control unit (hereinafter referred to as a battery ECU) 52. To the battery ECU 52, signals required for controlling the battery 50, for example, an inter-terminal voltage from an unshown voltage sensor placed between terminals of the battery 50, a charge-discharge current from an unshown current sensor mounted to an electric power line 54 connected to an output terminal of the battery 50, and battery temperature Tb from a temperature sensor 51 mounted to the battery 50 are input, and the battery ECU 52 outputs data on the state of the battery 50 to the hybrid electronic control unit 70 by communication as required. The battery ECU 52 performs arithmetic operations to compute the state of charge (SOC) based on an integrated value of the charge-discharge current detected by the current sensor for controlling the battery 50, and performs arithmetic operations to compute input and output limits Win and Wout that are maximum allowable electric power that may charge and discharge the battery 50 based on the computed state of charge (SOC) and the battery temperature Tb.

To the electric power line 54 connected to the output terminal of the battery 50, a DC/DC converter 56 that converts a voltage of DC electric power and supplies the voltage to the battery 50 is connected, and to the DC/DC converter 56, an AC/DC converter 58 is connected that converts AC electric power from a commercial power supply supplied via a power cord 59 into DC electric power. Thus, the power cord 59 is connected to the commercial power supply and the AC/DC converter 58 and the DC/DC converter 56 are controlled to charge the battery 50 with the electric power from the commercial power supply. The AC/DC converter 58 and the DC/DC converter 56 are controlled by the hybrid electronic control unit 70.

The hybrid electronic control unit 70 is configured as a microprocessor mainly including a CPU 72, a ROM 74 that stores a processing program, a RAM 76 that temporarily stores data, and unshown input and output ports and communication ports. To the hybrid electronic control unit 70, an ignition signal from an ignition switch 80, a shift position SP from a shift position sensor 82 that detects an operation position of a shift lever 81, an accelerator opening Acc from an accelerator pedal position sensor 84 that detects a depression amount of an accelerator pedal 83, a brake pedal position BP from a brake pedal position sensor 86 that detects a depression amount of a brake pedal 85, and a vehicle speed V from a vehicle speed sensor 88 are input via the input port. From the hybrid electronic control unit 70, a switching control signal to the DC/DC converter 56 and a switching control signal to the AC/DC converter 58 are output via the output port. As described above, the hybrid electronic control unit 70 is connected to the engine ECU 24, the motor ECU 40, and the battery ECU 52 via communication ports, and transmits and receives various control signals and data to and from the engine ECU 24, the motor ECU 40, and the battery ECU 52.

In the hybrid vehicle 20 thus configured according to the embodiment, operation of the engine 22 and the motors MG1 and MG2 is controlled so that a torque demand to be outputted to the ring gear shaft 32*a* as the drive shaft is calculated based on the accelerator opening Acc corresponding to the depression amount of the accelerator pedal 83 by a driver and the vehicle speed V, and a power demand corresponding to the torque demand is outputted to the ring gear shaft 32*a*. The operation control of the engine 22 and the motors MG1 and MG2 includes: a torque conversion operation mode in which the operation of the engine 22 is controlled so that power corresponding to the power demand is outputted from the engine 22, and the motor MG1 and the motor MG2 are driven and controlled so that all of the power outputted from the engine 22 is torque converted by the power distribution and integration mechanism 30 and the motors MG1 and MG2 and outputted to the ring gear shaft 32*a*; a charge-discharge operation mode in which the operation of the engine 22 is controlled so that power corresponding to the sum of the power demand and electric power required for charge and discharge of the battery 50 is outputted from the engine 22, and the motor MG1 and the motor MG2 are driven and controlled so that all or part of the power outputted from the engine 22 with charge and discharge of the battery 50 is torque converted by the power distribution and integration mechanism 30 and the motors MG1 and MG2, and the power demand is outputted to the ring gear shaft 32*a*; and a motor operation mode in which operation is controlled so that the operation of the engine 22 is stopped and power corresponding to a power demand from the motor MG2 is outputted to the ring gear shaft 32*a*. The torque conversion operation mode and the charge-discharge operation mode are the modes in which the engine 22 and the motors MG1 and MG2 are controlled so that the power demand is outputted to the ring gear shaft 32*a* with the operation of the engine 22, and thus these modes can be collectively considered as an engine operation mode.

Figure 3:
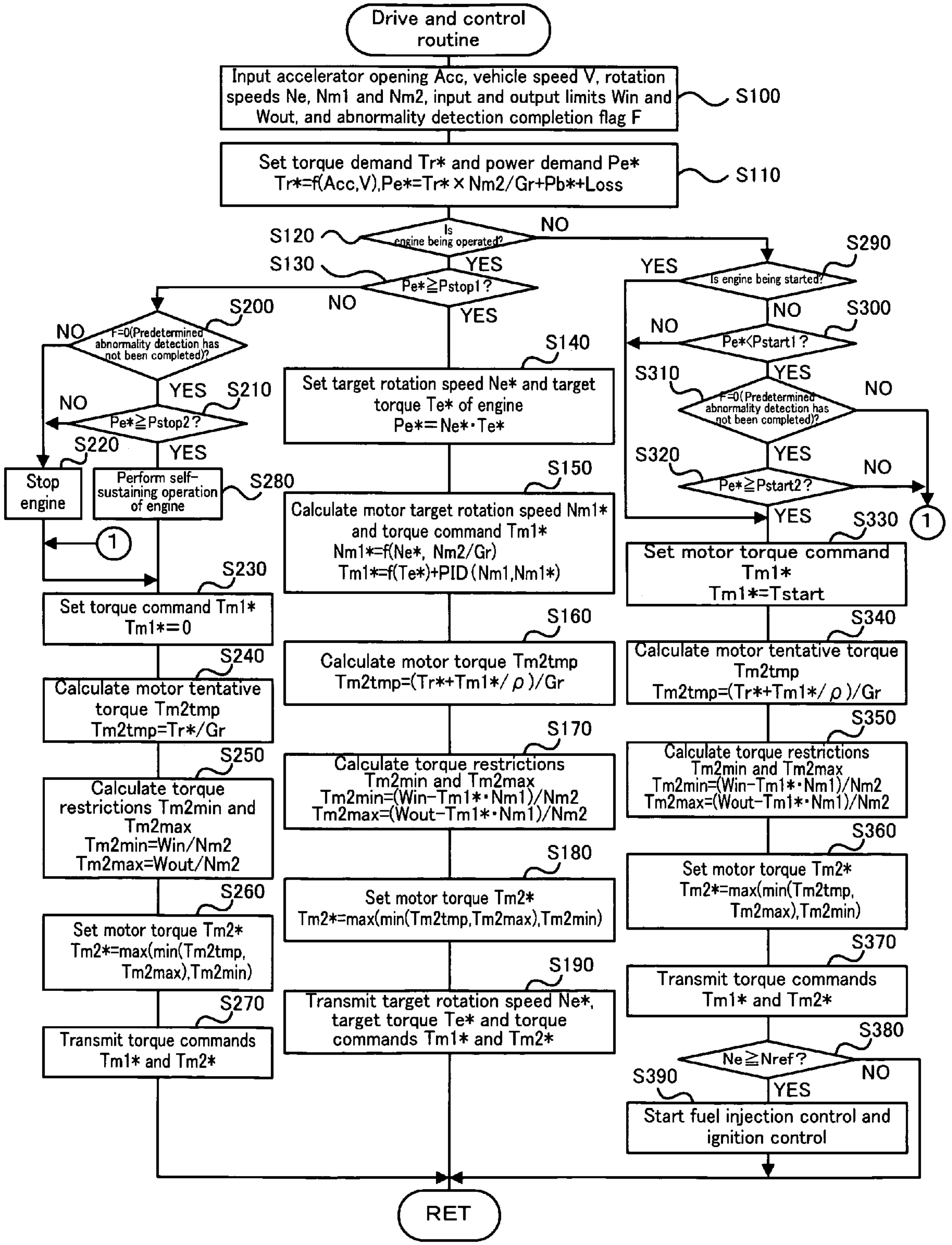
FIG. 3 is a flowchart of an example of a drive and control routine performed by a hybrid electronic control unit 70 in the embodiment.

Next, the operation of the hybrid automobile 20 of the embodiment thus constituted will be described. FIG. 3 is a flow chart showing an example of a drive and control routine executed by the hybrid electronic control unit 70. The routine is repeatedly executed every predetermined time (for example, every several msec).

When a drive and control routine is performed, the CPU 72 of the hybrid electronic control unit 70 first performs a processing for inputting data required for control such as the accelerator opening Acc from the accelerator pedal position sensor 84, the vehicle speed V from the vehicle speed sensor 88, the rotation speed Ne of the engine 22, rotation speeds Nm1 and Nm2 of the motors MG1 and MG2, the input and output limits Win and Wout of the battery 50, and an abnormality detection completion flag F (Step S100). The rotation speed Ne of the engine 22 computed based on the signal from the crank position sensor 140 is inputted from the engine ECU 24 by communication. The rotation speeds Nm1 and Nm2 of the motors MG1 and MG2 computed based on rotational positions of rotors of the motors MG1 and MG2 detected by the rotational position detection sensors 43 and 44 are inputted from the motor ECU 40 by communication. Further, the input and output limits Win and Wout of the battery 50 set based on the battery temperature Tb of the battery 50 and the state of charge (SOC) of the battery 50 are inputted from the battery ECU 52 by communication. The abnormality detection completion flag F set to zero (initialized) when a system is started and set to one when an unshown abnormality detection routine that performs predetermined abnormality detection with the operation of the engine 22 has been completed, and stored in a predetermined area in the RAM 24*c* is inputted from the engine ECU 24 by communication. In the abnormality detection routine, during the operation of the engine 22, the engine ECU 24 detects whether there is abnormality in, for example, a fuel system such as the fuel injection valve 126, an ignition system such as the ignition plug 130 and the ignition coil 138, and various sensors such as the air/fuel ratio sensor 135*a* and the oxygen sensor 135*b*. When the abnormality is detected, a processing for storing a corresponding code (diagnostic code) is performed. In the embodiment, when such an abnormality detection routine has been completed, the abnormality detection completion flag F is set to one. However, when there are a plurality of test items, the abnormality detection completion flag F may be set to one when abnormality detection of all of the plurality of test items has been completed or when abnormality detection of part of the plurality of test items has been completed. In the latter case, it is preferable that the abnormality detection completion flag F is set to one when abnormality detection of a test item with high priority among the plurality of test items has been completed.

Figure 4:
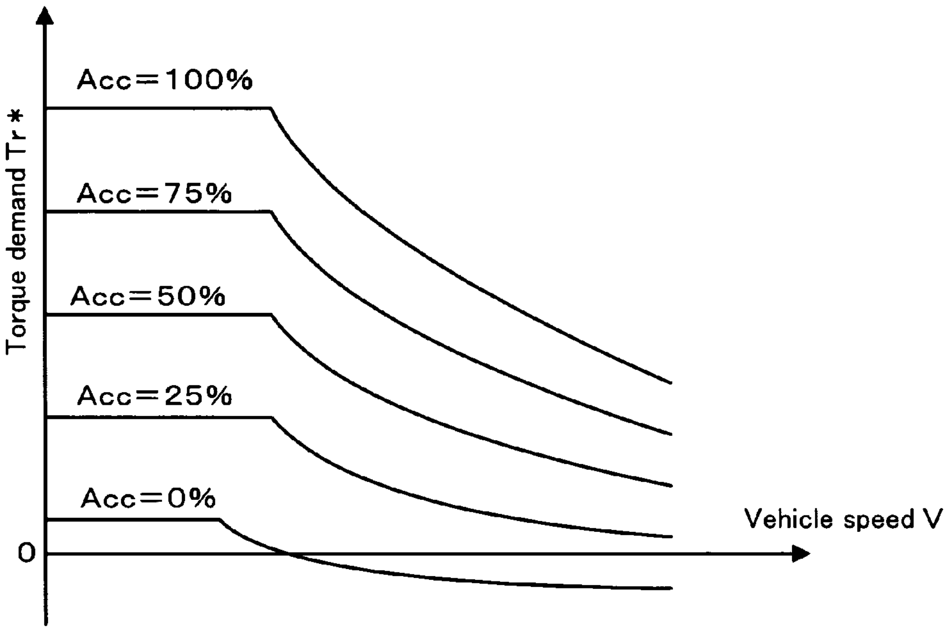
FIG. 4 illustrates an example of a torque demand setting map.

When the data is thus inputted, a torque demand Tr* to be outputted to the ring gear shaft 32*a* as the drive shaft joined to the drive wheels 63*a* and 63*b* as torque required by the vehicle based on the input accelerator opening Acc and the vehicle speed V, and a power demand Pe* required by the engine 22 are set (Step S110) In the embodiment, the torque demand Tr* is set by presetting a relationship between the accelerator opening Acc, the vehicle speed V and the torque demand Tr* and storing the relationship as a torque demand setting map in the ROM 74, and deriving a corresponding torque demand Tr* from the stored map when the accelerator opening Acc and the vehicle speed V are given. FIG. 4 shows an example of the torque demand setting map. The power demand Pe* can be calculated as the sum of the set torque demand Tr* multiplied by a rotation speed Nr of the ring gear shaft 32*a*, a charge-discharge power demand Pb* required by the battery 50 and loss Loss. The charge-discharge power demand Pb* set by the battery ECU 52 based on the state of charge (SOC) of the battery 50 can be inputted by communication. For example, power on a charge side may be set when the state of charge (SOC) is lower than a target value, and power on a discharge side may be set when the state of charge (SOC) exceeds the target value. Alternatively, the power on the discharge side may be set until the state of charge (SOC) approaches a lower limit value in an allowable range, and then the power on the charge side may be set. The rotation speed Nr of the ring gear shaft 32*a* may be calculated by multiplying the vehicle speed V by a conversion factor k (Nr=k·V), or by dividing the rotation speed Nm2 of the motor MG2 by a gear ratio Gr of the reduction gear 35 (Nr=Nm2/Gr).

Then, it is determined whether the engine 22 is being operated (Step S120). When the engine 22 is being operated, it is determined whether the set power demand Pe* is less than a threshold Pstop1 for stopping the operation of the engine 22 (Step S130). As the threshold Pstop1, a value close to the lower limit value in the power area that allows relatively efficient operation of the engine 22 can be used.

Figure 5:
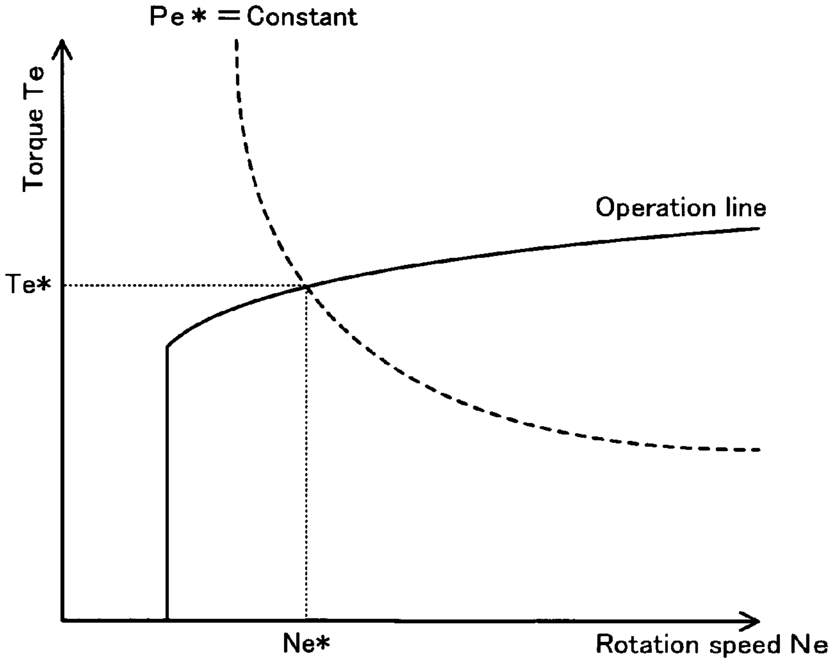
FIG. 5 illustrates an example of an operation line of the engine 22 and a state of setting a target rotation speed Ne* and a target torque Te*.

When the power demand Pe* is the threshold Pstop1 or more, it is determined that the operation of the engine 22 is to be continued, and the target rotation speed Ne* and the target torque Te* are set as operation points where the engine 22 is to be operated based on the set-power demand Pe* of the engine 22 (Step S140). This setting is performed based on an operation line for efficiently operating the engine 22 and the power demand Pe*. FIG. 5 shows an example of the operation line of the engine 22 and a state of setting the target rotation speed Ne* and the target torque Te*. As shown, the target rotation speed Ne* and the target torque Te* can be calculated from an intersection point between the operation line and a curve with a constant power demand Pe* (Ne*×Te*).

Next, a target rotation speed Nm1* of the motor MG1 is calculated using the target rotation speed Ne* of the engine 22, the rotation speed Nm2 of the motor MG2, and a gear ratio ρ of the power distribution and integration mechanism 30 by the following formula (1), and a torque command Tm1* to be outputted from the motor MG1 is calculated based on the calculated target rotation speed Nm1* and the input rotation speed Nm1 of the motor MG1 by the formula (2) (Step S150).

Figure 6:
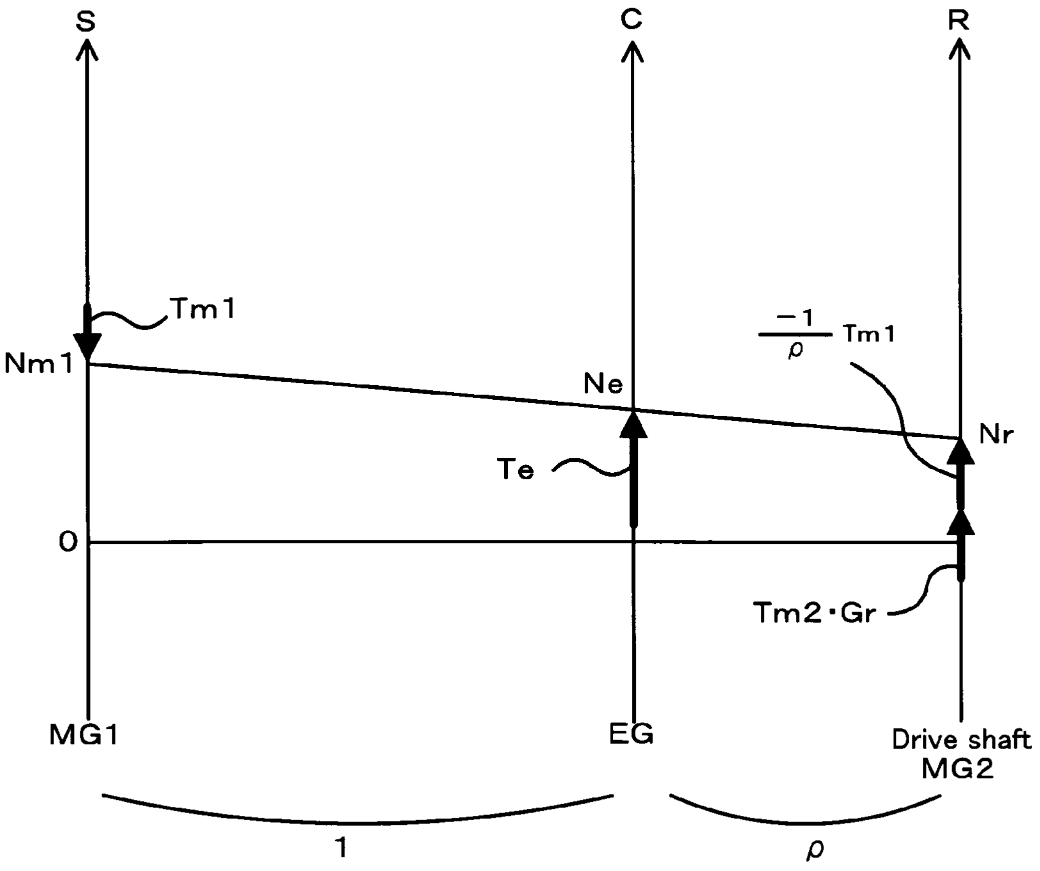
FIG. 6 illustrates an example of an alignment chart showing a dynamic relationship between a rotation speed and torque of a rotating element of a power distribution and integration mechanism 30 when a vehicle is running with the engine 22 outputting power.

The formula (1) is a dynamic relational expression of a rotating element of the power distribution and integration mechanism 30. FIG. 6 shows a dynamic relationship between a rotation speed and torque of the rotating element of the power distribution and integration mechanism 30 when the vehicle is running with the engine 22 outputting power. In FIG. 6, an S-axis on the left indicates a rotation speed of the sun gear 31 that is the rotation speed Nm1 of the motor MG1, a C-axis indicates a rotation speed of the carrier 34 that is the rotation speed Ne of the engine 22, and an R-axis indicates a rotation speed Nr of the ring gear 32 obtained by dividing the rotation speed Nm2 of the motor MG2 by the gear ratio Gr of the reduction gear 35. The formula (1) can be easily derived using this alignment chart. Two bold arrows on the R-axis indicate torque including the torque Tm1 outputted from the motor MG1 and applied to the ring gear shaft 32*a*, and torque including the torque Tm2 outputted from the motor MG2 and applied to the ring gear shaft 32*a* via the reduction gear 35. The formula (2) is a relational expression in feedback control for rotating the motor MG1 at the target rotation speed Nm1*. In the formula (2), "k1" in the second term on the right side is a gain of a proportional term, and "k2" in the third term on the right side is a gain of an integral term.

$$Nm1^{*}=Ne^{*}\cdot(1+\rho)/\rho-Nm2/\rho \quad (1)$$

$$Tm1^{*}=\rho\cdot Te^{*}/(1+\rho)+k1(Nm1^{*}-Nm1)+k2\int(Nm1^{*}-Nm1)dt \quad (2)$$

Then, the torque command Tm1* divided by the gear ratio ρ of the power distribution and integration mechanism 30 is added to the torque demand Tr* to calculate tentative torque Tm2tmp that is a temporary value of torque to be outputted from the motor MG2 by the following formula (3) (Step S160), and a deviation between the input and output limits Win and Wout of the battery 50 and power consumption (generation electric power) of the motor MG1 obtained by multiplying the set torque command Tm1* by the present rotation speed Nm1 of the motor MG1 is divided by the rotation speed Nm2 of the motor MG2 to calculate torque restrictions Tm2min and Tm2max as upper and lower limits of torque that may be outputted from the motor MG2 by the following formulas (4) and (5) (Step S170), and the set tentative torque Tm2tmp is restricted by the torque restrictions Tm2min and Tm2max by the formula (6) to set the torque command Tm2* of the motor MG2 (Step S180). The formula (3) can be easily derived from the alignment chart in FIG. 6.

$$Tm2tmp=(Tr^{*}+Tm1^{*}/\rho)/Gr \quad (3)$$

$$Tm2\mathrm{min}=(W\mathrm{in}-Tm1^{*}\cdot Nm1)/Nm2 \quad (4)$$

$$Tm2\mathrm{max}=(W\mathrm{out}-Tm1^{*}-Nm1)/Nm2 \quad (5)$$

$$Tm2^{*}=\mathrm{max}(\mathrm{min}(Tm2tmp,\ Tm2\mathrm{max}),Tm2\mathrm{min}) \quad (6)$$

In this manner, when the target rotation speed Ne* and the target torque Te* of the engine 22, and the torque commands Tm1* and Tm2* of the motors MG1 and MG2 are set, the target rotation speed Ne* and the target torque Te* of the engine 22 are transmitted to the engine ECU 24, and the torque commands Tm1* and Tm2* of the motors MG1 and MG2 are transmitted to the motor ECU 40 (Step S190), and the drive and control routine is finished. The engine ECU 24 having received the target rotation speed Ne* and the target torque Te* performs control such as intake air amount control, fuel injection control, and ignition control of the engine 22 so that the engine 22 is operated at the operation points indicated by the target rotation speed Ne* and the target torque Te*. The motor ECU 40 having received the torque commands Tm1* and Tm2* performs switching control of switching elements of the inverters 41 and 42 so that the motor MG1 is driven by the torque command Tm1* and the motor MG2 is driven by the torque command Tm2*. Such control allows the vehicle to run with the engine 22 being efficiently operated within the range of the input and output limits Win and Wout of the battery 50 and the torque demand Tr* being outputted to the ring gear shaft 32*a* as the drive shaft.

When it is determined in Step S130 that the power demand Pe* is less than the threshold Pstop1, it is determined whether the input abnormality detection completion flag F is zero, that is, whether the above described predetermined abnormality detection has not been completed (Step S200), and whether the power demand Pe* is less than a threshold Pstop2 (Step S210). The threshold Pstop2 is a threshold for determining whether the operation of the engine 22 is to be continued when the abnormality detection completion flag F is zero, that is, when the predetermined abnormality detection has not been completed, and set to a smaller value than the threshold Pstop1 so as to prevent the operation of the engine 22 from being stopped.

When the abnormality detection completion flag F is one, or when the abnormality detection completion flag F is zero but the power demand Pe* is less than the threshold Pstop2, it is determined that the operation of the engine 22 is to be stopped, a control signal for stopping the fuel injection control and the ignition control to stop the operation of the engine 22 is transmitted to the engine ECU 24 to stop the engine 22 (Step S220), and the torque command Tm1* of the motor MG1 is set to zero (Step S230). The torque demand Tr* divided by the gear ratio Gr of the reduction gear 35 is set as the tentative torque Tm2tmp that is the temporary value of torque to be outputted from the motor MG2 (Step S240), the torque command Tm1* of zero is assigned in the formulas (4) and (5) to calculate the torque restrictions Tm2min and Tm2max of the motor MG2 (Step S250), the tentative torque Tm2tmp is restricted by the torque restrictions Tm2min and Tm2max by the formula (6) to set the torque command Tm2* of the motor MG2 (Step S260), the set torque commands Tm1* and Tm2* are transmitted to the motor ECU 40 (Step S270), and this routine is finished. Such control allows the vehicle to run with the engine 22 being stopped and the torque demand Tr* being outputted from the motor MG2 to the ring gear shaft 32*a* as the drive shaft within the range of the input and output limits Win and Wout of the battery 50.

When the abnormality detection completion flag F is zero, and the power demand Pe* is the threshold Pstop2 or more, it is determined whether the operation of the engine 22 is to be continued, a control signal for performing self-sustaining operation of the engine 22 at a predetermined rotation speed (for example, 1200 rpm) is transmitted to the engine ECU 24 to perform the self-sustaining operation of the engine 22 (Step S280), the torque command Tm1* of the motor MG1 is set to zero (Step S230), the processings in Steps S240 to S270 are performed, and this routine is finished. Such control allows the vehicle to run with the engine 22 performing the self-sustaining operation and the torque demand Tr* being outputted from the motor MG2 to the ring gear shaft 32*a* as the drive shaft within the range of the input and output limits Win and Wout of the battery 50.

When it is determined in Step S120 that the engine 22 is not being operated, that is, the operation of the engine 22 is stopped, it is determined whether the engine 22 is being started (Step S290), whether the power demand Pe* is a threshold Pstart1 or more for starting the engine 22 (Step S300), whether the abnormality detection completion flag F is zero, that is, the predetermined abnormality detection has been completed (Step S310), and whether the power demand Pe* is a threshold Pstart2 or more (Step S320). As the threshold Pstart1, a value close to the lower limit value in the power area that allows relatively efficient operation of the engine 22 can be used. However, a value larger than the threshold Pstop1 for stopping the operation of the engine 22 is preferably used for preventing frequent stops and starts of the engine 22. As the threshold Pstart2, a value smaller than the threshold Pstart1 is used so that the engine 22 is easily started for ensuring performance of the predetermined abnormality detection performed with the operation of the engine 22. Also in this case, a value larger than the threshold Pstop2 is preferably used for preventing frequent stops and starts of the engine 22. When it is determined in Step S290 that the engine 22 is not being started, it is determined in Step S300 that the power demand Pe* is less than the threshold Pstart1, and it is determined in Step S310 that the abnormality detection completion flag F is one, or when it is determined in Step S310 that the abnormality detection completion flag F is zero but it is determined in Step S320 that the power demand Pe* is less than the threshold Pstart2, it is determined that the operation stop state of the engine 22 is to be continued, and the processings in Steps S230 to S270 are performed.

When it is determined in Step S120 that the operation of the engine 22 is stopped, it is determined in Step S290 that the engine 22 is not being started, and it is determined in Step S300 that the power demand Pe* is the threshold Pstart1 or more, or when it is determined in Step S300 that the power demand Pe* is less than the threshold Pstart1 but it is determined in Step S310 that the abnormality detection completion flag F is zero, and it is determined in Step S320 that the power demand Pe* is the threshold Pstart2 or more, it is determined that the engine 22 is to be started, a torque Tstart required for starting the engine 22 is set to the torque command Tm1* of the motor MG1 (Step S330), the tentative torque Tm2tmp that is the temporary value of the torque to be outputted from the motor MG2 is calculated by the formula (3) (Step S340), the torque restrictions Tm2min and Tm2max of the motor MG2 are calculated by the formulas (4) and (5) (Step S350), the tentative torque Tm2tmp is restricted by the torque restrictions Tm2min and Tm2max by the formula (6) to set the torque command Tm2* of the motor MG2 (Step S360), and the set torque commands Tm1* and Tm2* are transmitted to the motor ECU 40 (Step S370).

Then, it is determined whether the rotation speed Ne of the engine 22 reaches a rotation speed Nref for starting the fuel injection control and the ignition control (Step S380). The time of commencement of the start of the engine 22 is now supposed, and thus the rotation speed Ne of the engine 22 is low and does not reach the rotation speed Nref. Thus, a negative result is obtained in this determination, and this routine is finished without starting the fuel injection control and the ignition control.

When the start of the engine 22 is commenced, it is determined in Step S290 that the engine 22 is being started, and thus the processings in Steps S330 to S380 are performed, it is waited that the rotation speed Ne of the engine 22 reaches the rotation speed Nref or higher for starting the fuel injection control and the ignition control (Step S380), and a control signal is transmitted to the engine ECU 24 for starting the fuel injection control and the ignition control (Step S390). Such control allows the vehicle to run with the stopped engine 22 being started and the torque demand Tr* being outputted from the motor MG2 to the ring gear shaft 32*a* as the drive shaft within the range of the input and output limits Win and Wout of the battery 50. The drive and control routine has been described above.

Now, a state where the vehicle is running in the motor operation mode is supposed. As described above, in the hybrid vehicle 20 of the embodiment, the battery 50 can be previously charged with electric power from a commercial power supply, and thus the vehicle can run for long hours in the motor operation mode with the electric power of the battery 50. The predetermined abnormality detection of abnormality in the fuel system such as the fuel injection valve 126, abnormality in the ignition system such as the ignition plug 130, and abnormality in a predetermined sensor such as the air/fuel ratio sensor 135*a* is performed with the operation of the engine 22. Thus, if the motor operation mode is continued for long hours, the abnormality detection cannot be performed with appropriate frequency. In the embodiment, in the case where the abnormality detection completion flag F is zero, that is, the case where the predetermined abnormality detection has not been completed, the engine 22 is started when the operation of the engine 22 is stopped and the power demand Pe* becomes the threshold Pstart2 or more smaller than the threshold Pstart1 for starting the engine 22 in normal time, and the operation of the engine 22 is stopped when the engine 22 is being operated and the power demand Pe* becomes less than the threshold Pstop2 smaller than the threshold Pstop1 for stopping the operation of the engine 22 in the normal time, thereby allowing the engine 22 to be easily started and preventing the operation of the engine 22 from being stopped as compared with in the normal time, and thus allowing the predetermined abnormality detection to be performed with appropriate frequency.

According to the hybrid vehicle 20 of the embodiment described above, in the case where the abnormality detection completion flag F is one, that is, the case where the predetermined abnormality detection has been completed, the engine 22 is started when the operation of the engine 22 is stopped and the power demand Pe* is the threshold Pstart1 or more, and the operation of the engine 22 is stopped when the engine 22 is being operated and the power demand Pe* is less than the threshold Pstart1. In the case where the abnormality detection completion flag F is zero, that is, the case where the predetermined abnormality detection has not been completed, the engine 22 is started when the operation of the engine 22 is stopped and the power demand Pe* is the threshold Pstart2 or more smaller than the threshold Pstart1, and the operation of the engine 22 is stopped when the engine 22 is being operated and the power demand Pe* is less than the threshold Pstop2 smaller than the threshold Pstop1. This allows the engine 22 to be easily started and prevents the operation of the engine 22 from being stopped, that is, allows the engine operation mode to be easily selected until the completion of the predetermined abnormality detection, and thus allows the predetermined abnormality detection performed with the operation of the engine 22 to be completed more reliably. Further, when the engine 22 is being operated, the power demand Pe* is less than the threshold Pstop1, the abnormality detection completion flag F is zero, and the power demand Pe* is the threshold Pstop2 or more, the engine 22 performs the self-sustaining operation, thereby allowing the predetermined abnormality detection to be performed more stably. Naturally, the vehicle can run with the torque demand Tr* being outputted to the ring gear shaft 32*a* as the drive shaft within the range of the input and output limits Win and Wout of the battery 50.

In the hybrid vehicle 20 of the embodiment, when the engine 22 is being operated and the power demand Pe* is less than the threshold Pstop1, but the abnormality detection completion flag F is zero and the power demand Pe* is the threshold Pstop2 or more, the engine 22 and the motors MG1 and MG2 are controlled so that the engine 22 performs the self-sustaining operation and the torque demand Tr* is outputted to the ring gear shaft 32*a* as the drive shaft. However, the engine 22 and the motors MG1 and MG2 may be controlled so that the power demand Pe* is outputted from the engine 22 and the torque demand Tr* is outputted to the ring gear shaft 32*a*.

In the hybrid vehicle 20 of the embodiment, the motor MG2 is mounted to the ring gear shaft 32*a* as the drive shaft via the reduction gear 35, but the motor MG2 may be mounted to the ring gear shaft 32*a* directly or via a transmission such as a two-speed, three-speed, or four-speed transmission in place of the reduction gear 35.

Figure 7:
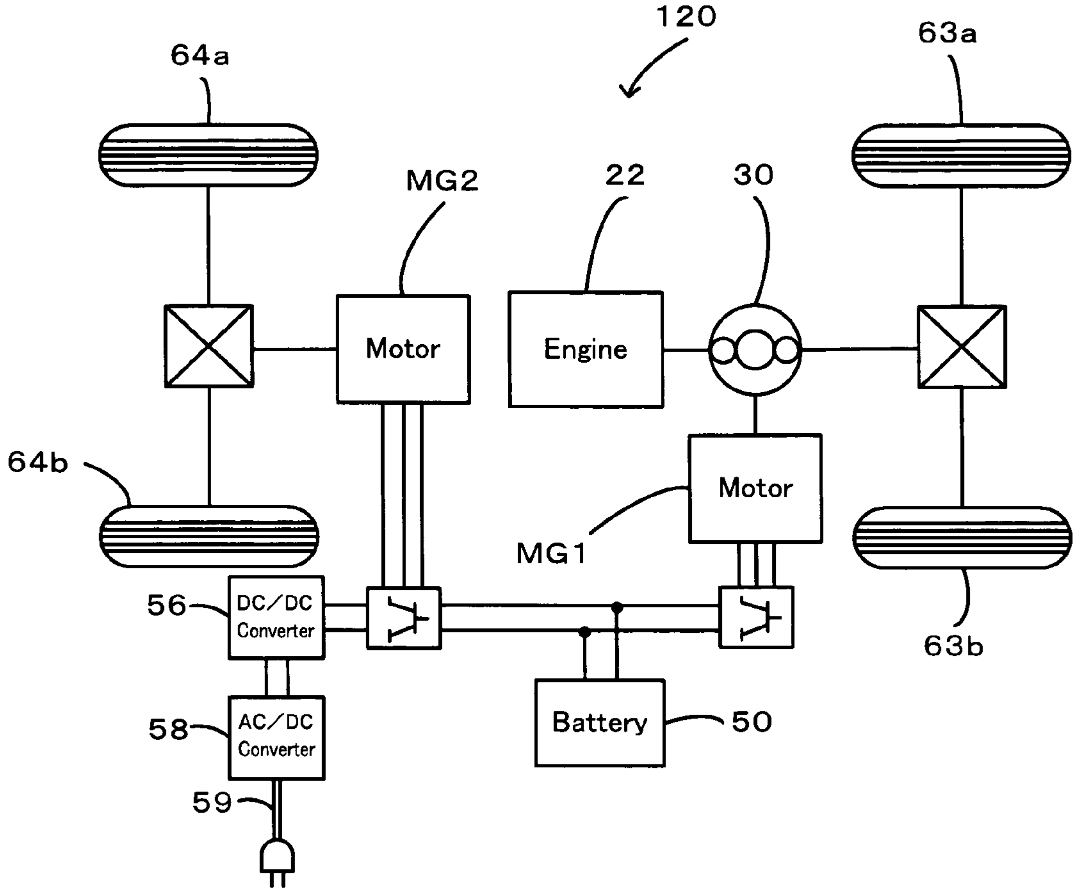
FIG. 7 is a schematic block diagram of a configuration of a hybrid vehicle 120 according to a variant.

In the hybrid vehicle 20 of the embodiment, the power of the motor MG2 is changed in speed by the reduction gear 35 and outputted to the ring gear shaft 32*a*. However, as exemplified by a hybrid vehicle 120 of a variant in FIG. 7, power of a motor MG2 may be connected to an axle (an axle connected to wheels 64*a* and 64*b* in FIG. 7) different from an axle connected to a ring gear shaft 32*a* (an axle connected to drive wheels 63*a* and 63*b*).

Figure 8:
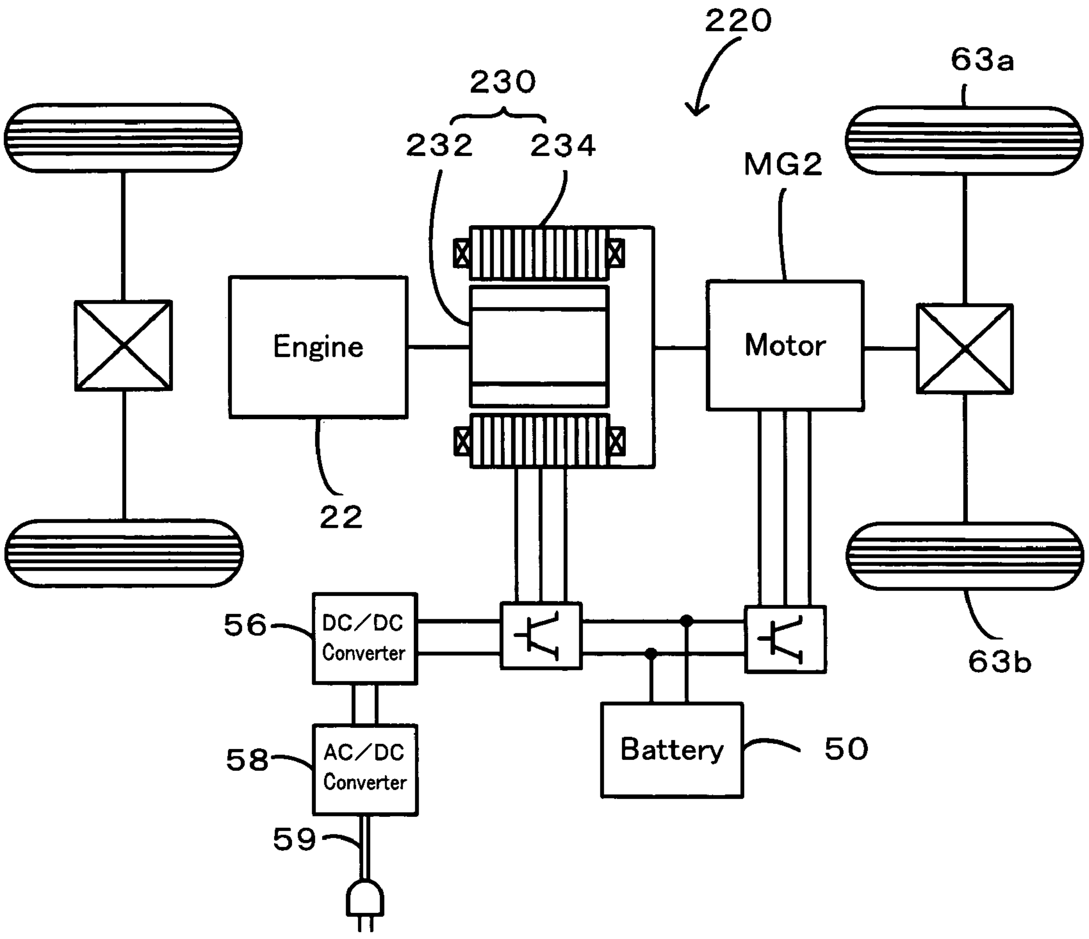
FIG. 8 is a schematic block diagram of a configuration of a hybrid vehicle 220 according to a variant.

In the hybrid vehicle 20 of the embodiment, the power of the engine 22 is outputted to the ring gear shaft 32*a* as the drive shaft connected to the drive wheels 63*a* and 63*b* via the power distribution and integration mechanism 30. However, as exemplified by a hybrid vehicle 220 of a variant in FIG. 8, a pair-rotor electric motor 230 may be provided that includes an inner rotor 232 connected to a crankshaft 26 of an engine 22 and an outer rotor 234 connected to a drive shaft that outputs power to drive wheels 63*a* and 63*b*, transmits part of the power of the engine 22 to the drive shaft, and converts the remaining power into electric power.

The hybrid vehicle 20 of the embodiment includes the engine 22, the power distribution and integration mechanism 30, and the motors MG1 and MG2. However, the present invention may be applied to a so-called series hybrid vehicle including a generator connected to an output shaft of an engine, an electric motor that inputs and outputs power to a drive shaft, and a battery that supplies and receives electric power to and from the generator and the electric motor.

The present invention is not restrictively applied to the hybrid vehicle, but may be applied to a control method of a hybrid vehicle.

Now, correspondences between essential components in the embodiment and the variants and essential components described in SUMMARY will be described. In the embodiment, the engine 22 corresponds to "internal combustion engine", the motor MG2 corresponds to "electric motor", the battery 50 corresponds to "accumulator unit", the engine ECU 24 that performs the predetermined abnormality detection with the operation of the engine 22 to set the abnormality detection completion flag F corresponds to "abnormality detection module", and the hybrid electronic control unit 70 that performs the processing in Step S110 of the drive and control routine in FIG. 3 for setting the torque demand Tr* based on the accelerator opening Acc and the vehicle speed V corresponds to "required driving force setting module". The hybrid electronic control unit 70 that sets the target rotation speed Ne* and the target torque Te* of the engine 22 and the control signal so that in the case where the abnormality detection completion flag F is 1, the engine 22 is started when the operation of the engine 22 is stopped and the power demand Pe* is the threshold Pstart1 or more, and the operation of the engine 22 is stopped when the engine 22 is being operated and the power demand Pe* is less than the threshold Pstop1, and the torque demand Tr* is outputted to the ring gear shaft 32*a* as the drive shaft within the range of the input and output limits Win and Wout of the battery 50, sets the torque commands Tm1* and Tm2* of the motors MG1 and MG2, and transmits the torque commands Tm1* and Tm2* to the engine ECU 24 and the motor ECU 40, and sets the target rotation speed Ne* and the target torque Te* of the engine 22 and the control signal so that in the case where the abnormality detection completion flag F is 0, the engine 22 is started when the operation of the engine 22 is stopped and the power demand Pe* is the threshold Pstart2 or more smaller than the threshold Pstart1, and the operation of the engine 22 is stopped when the engine 22 is being operated and the power demand Pe* is less than the threshold Pstop2 smaller than the threshold Pstop1, and the torque demand Tr* is outputted to the ring gear shaft 32*a* within the range of the input and output limits Win and Wout of the battery 50, sets the torque commands Tm1* and Tm2* of the motors MG1 and MG2, and transmits the torque commands Tm1* and Tm2* to the engine ECU 24 and the motor ECU 40; the engine ECU 24 that controls the operation of the engine 22 based on the target rotation speed Ne*, the target torque Te* and the control signal; and the motor ECU 40 that controls the motors MG1 and MG2 based on the torque commands Tm1* and Tm2* correspond to "control unit". The power distribution and integration mechanism 30 and the motor MG1 correspond to "electric power and mechanical power input output module". The motor MG1 corresponds to "generator", and the power distribution and integration mechanism 30 corresponds to "three shaft-type power input output module". The pair-rotor electric motor 230 also corresponds to the "electric power and mechanical power input output module". The "internal combustion engine" is not limited to an internal combustion engine that outputs power from hydrocarbon fuel such as gasoline or gas oil, but may be any type of internal combustion engine such as a hydrogen engine. The "electric motor" is not limited to the motor MG2 configured as a synchronous motor generator, but may be any type of electric motor such as an induction motor that can input and output power to a drive shaft. The "accumulator unit" is not limited to the battery 50 as a secondary battery, but may be of any type such as a capacitor that can be charged by an external power supply and can supply and receive electric power to and from an electric motor. The "abnormality detection module" is not limited to the one that detects whether there is abnormality in the fuel system such as the fuel injection valve 126, the ignition system such as the ignition plug 130 and the ignition coil 138, the various sensors such as the air/fuel ratio sensor 135*a* and the oxygen sensor 135*b* and sets the abnormality detection completion flag F, but may be of any type that performs predetermined abnormality detection with the operation of the internal combustion engine. The "required driving force setting module" is not limited to the one that sets the torque demand Tr* based on the accelerator opening Acc and the vehicle speed V, but may be of any type that sets a required driving force required for running such as the one that sets a torque demand based on an accelerator opening Acc only, or the one that sets a torque demand based on a running position in a running path in the case where the running path is preset. The "control unit" is not limited to the combination of the hybrid electronic control unit 70, the engine ECU 24 and the motor ECU 40, but may be constituted by a single electronic control unit. The "control unit" is not limited to the one that sets the target rotation speed Ne* and the target torque Te* of the engine 22 and the control signal so that in the case where the abnormality detection completion flag F is one, the engine 22 is started when the operation of the engine 22 is stopped and the power demand Pe* is the threshold Pstart1 or more, and the operation of the engine 22 is stopped when the engine 22 is being operated and the power demand Pe* is less than the threshold Pstop1, and the torque demand Tr* is outputted to the ring gear shaft 32*a* as the drive shaft within the range of the input and output limits Win and Wout of the battery 50, sets the torque commands Tm1* and Tm2* of the motors MG1 and MG2, and controls the engine 22 and the motors MG1 and MG2, and sets the target rotation speed Ne* and the target torque Te* of the engine 22 and the control signal so that in the case where the abnormality detection completion flag F is zero, the engine 22 is started when the operation of the engine 22 is stopped and the power demand Pe* is the threshold Pstart2 or more smaller than the threshold Pstart1, and the operation of the engine 22 is stopped when the engine 22 is being operated and the power demand Pe* is less than the threshold Pstop2 smaller than the threshold Pstop1, and the torque demand Tr* is outputted to the ring gear shaft 32*a* within the range of the input and output limits Win and Wout of the battery 50, sets the torque commands Tm1* and Tm2* of the motors MG1 and MG2, and controls the engine 22 and the motors MG1 and MG2, but may be of any type that controls an internal combustion engine and an electric motor so that when predetermined abnormality detection has been performed, an electric motor operation mode or an engine operation mode is selected under a predetermined condition, and a vehicle runs with a driving force based on a required driving force in the selected mode, and controls the internal combustion engine and the electric motor so that when the predetermined abnormality detection has not been performed, the electric motor operation mode or the engine operation mode is selected under a condition different from the predetermined condition so that the engine operation mode is easily selected, and the vehicle runs with a driving force based on a required driving force in the selected mode. The "electric power and mechanical power input output module" is not limited to the combination of the power distribution and integration mechanism 30 and the motor MG1 or the pair-rotor electric motor 230, but may be of any type that is connected to a drive shaft joined to an axle and connected to an output shaft of the internal combustion engine rotatably independently from the drive shaft, and can input and output power to the drive shaft and the output shaft with input and output of electric power and mechanical power. The "generator" is not limited to the motor MG1 configured as a synchronous motor generator, but may be any type of generator such as an induction motor that can input and output power. The "three shaft-type power input output module" is not limited to the above described power distribution and integration mechanism 30, but may be of any type that is connected to three shafts including a drive shaft, an output shaft, and a rotating shaft of a generator and inputs and outputs power to a remaining shaft based on power inputted and outputted to any shaft among the three shafts, such as the one using a double pinion planetary gear mechanism, the one including a plurality of combined planetary gear mechanisms and connected to four or more shafts, or the one such as a differential gear having a differential action different from the planetary gear. The correspondences between the essential components in the embodiment and the variants and the essential components described in SUMMARY are examples for describing in detail the best mode for carrying out the invention described in SUMMARY, and thus do not restrict the constituent elements of the invention described in SUMMARY. Specifically, the invention described in SUMMARY is to be construed based on the description in SUMMARY, and the embodiment is merely a detailed example of the invention described in SUMMARY.

The best mode for carrying out the present invention has been described using the embodiment, but the present invention is not limited to the embodiment and may be, of course, carried out in various modes without departing from the gist of the present invention.

What is claimed is:

1. A hybrid vehicle comprising:

an internal combustion engine;

an electric motor; and an accumulator unit that can supply and receive electric power to and from said electric motor and can be charged with electric power from an external power supply, said hybrid vehicle selecting an electric motor operation mode in which the vehicle can run with power from said electric motor with operation of said internal combustion engine being stopped, or an engine operation mode in which the vehicle can run with the operation of said internal combustion engine, said hybrid vehicle further comprising:

an abnormality detection module that performs predetermined abnormality detection with operation of said internal combustion engine;

a required driving force setting module that sets a required driving force required for running; and a control unit that controls said internal combustion engine and said electric motor so that when said predetermined abnormality detection has been performed, said electric motor operation mode or said engine operation mode is selected under a predetermined condition, and the vehicle runs with a driving force based on said set required driving force in said selected mode, and controls said internal combustion engine and said electric motor so that when said predetermined abnormality detection has not been performed, said electric motor operation mode or said engine operation mode is selected under a condition different from said predetermined condition so that said engine operation mode is easily selected, and the vehicle runs with a driving force based on said set required driving force in said selected mode.

2. A hybrid vehicle according to claim 1, wherein said control unit controls said internal combustion engine and said electric motor so that when said predetermined abnormality detection has not been performed, and when said electric motor operation mode is selected under said predetermined condition while said engine operation mode is selected under the condition different from the predetermined condition, said internal combustion engine performs self-sustaining operation and the vehicle runs with said set required driving force.

3. A hybrid vehicle according to claim 1, wherein said control unit selects said engine operation mode and performs control when said predetermined abnormality detection has been performed and power to be outputted from said internal combustion engine based on said set required driving force is a first threshold or more as said predetermined condition, and said control unit selects said engine operation mode and performs control when said predetermined abnormality detection has not been performed and power to be outputted from said internal combustion engine based on said set required driving force is a second threshold or more smaller than the first threshold as the condition different from said predetermined condition.

4. A hybrid vehicle according to claim 1, further comprising an electric power and mechanical power input output module that is connected to a drive shaft joined to an axle and connected to an output shaft of said internal combustion engine rotatably independently from said drive shaft, and can output at least part of power from said internal combustion engine to said drive shaft by input and output of electric power and mechanical power, wherein said control unit controls said internal combustion engine, said electric power and mechanical power input output module, and said electric motor so that the vehicle runs with the driving force based on said set required driving force.

5. A hybrid vehicle according to claim 4, wherein said electric power and mechanical power input output module includes a generator that can input and output power, and a three shaft-type power input output module that is connected to three shafts including the output shaft of said internal combustion engine, a rotating shaft of said generator, and said drive shaft, and inputs and outputs power to remaining one shaft based on power inputted and outputted to any two shafts among the three shafts.

6. A hybrid vehicle according to claim 1, wherein said abnormality detection module detects abnormality in a fuel system, an ignition system, and various sensors including an air/fuel ratio sensor and an oxygen sensor as said predetermined abnormality detection.

* * * * *